United States Patent
Takada

(10) Patent No.: US 8,576,411 B2
(45) Date of Patent: Nov. 5, 2013

(54) COMPONENT POSITION MEASUREMENT METHOD

(71) Applicant: Yazaki Corporation, Tokyo (JP)

(72) Inventor: Kazuhiko Takada, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 13/890,044

(22) Filed: May 8, 2013

(65) Prior Publication Data
US 2013/0250309 A1 Sep. 26, 2013

Related U.S. Application Data

(63) Continuation of application No. PCT/JP2011/076466, filed on Nov. 10, 2011.

(30) Foreign Application Priority Data

Nov. 10, 2010 (JP) .................................. 2010-251662

(51) Int. Cl.
*G01B 11/14* (2006.01)
*G01N 21/86* (2006.01)
*G01V 8/00* (2006.01)

(52) U.S. Cl.
USPC ...... 356/614; 356/621; 356/623; 250/559.29; 250/559.31; 250/559.33; 250/559.36

(58) Field of Classification Search
None
See application file for complete search history.

(56) References Cited

U.S. PATENT DOCUMENTS

| | | | | |
|---|---|---|---|---|
| 3,739,176 | A * | 6/1973 | Thorn | 356/141.1 |
| 4,576,482 | A * | 3/1986 | Pryor | 356/612 |
| 4,682,894 | A * | 7/1987 | Schmidt et al. | 356/614 |
| 5,008,555 | A | 4/1991 | Mundy | |
| 5,046,851 | A * | 9/1991 | Morgan | 356/615 |
| 7,313,264 | B2 * | 12/2007 | Crampton | 382/154 |
| RE43,895 | E * | 1/2013 | Crampton | 382/154 |
| 8,346,392 | B2 * | 1/2013 | Walser et al. | 700/259 |
| 2009/0039285 | A1 * | 2/2009 | Cooper | 250/442.11 |
| 2010/0111364 | A1 * | 5/2010 | Iida et al. | 382/103 |
| 2010/0156896 | A1 * | 6/2010 | Ichimura et al. | 345/419 |
| 2010/0274390 | A1 * | 10/2010 | Walser et al. | 700/259 |

FOREIGN PATENT DOCUMENTS

| | | |
|---|---|---|
| JP | 2010-027897 A | 2/2010 |
| JP | 2010-029897 A | 2/2010 |

OTHER PUBLICATIONS

International Search Report and Written Opinion of the International Search Report for PCT/JP2011/076466 dated Mar. 30, 2012.

* cited by examiner

Primary Examiner — Gordon Stock, Jr.
(74) *Attorney, Agent, or Firm* — Kenealy Vaidya LLP

(57) ABSTRACT

In the component position measurement method, the position B of the component 1 when the laser beam is blocked (the laser beam blocking position) is measured with respect to the chuck position A of the component 1. Since the component 1 generates a large vibration (inclination) during the chuck is used, the position of the leading end (front end) C of the component 1 is computed using the inclination angle θ with respect to the measurement value of the deviation amount H of the laser beam blocking position B of the component 1 based on a similarity relationship of a triangle.

2 Claims, 4 Drawing Sheets

COMPONENT POSITION MEASUREMENT METHOD

CROSS REFERENCE TO RELATED APPLICATION

This application is a continuation of PCT application No. PCT/JP2011/076466, which was filed on Nov. 10, 2011 based on Japanese Patent Application (No. 2010-251662) filed on Nov. 10, 2010, the contents of which are incorporated herein by reference. Also, all the references cited herein are incorporated as a whole.

BACKGROUND OF THE INVENTION

1. Field of the Invention

The present invention relates to a component position measurement method for measuring a position of a component and obtaining a leading end position of the component based on a similarity relationship of a triangle rather than the measurement result when a light beam, such as a laser beam, is blocked by the component.

2. Description of the Related Art

In the related art, various component position recognition methods are known for recognizing the position in a process of assembling of various elements of various electric or electronic components, and the like.

For example, the component position recognition method includes positioning a leading end of the component as a first method, guiding the component using a mechanical guide as a second method, and recognizing the component using a CCD (imaging device) as a third method.

For example, JP-A-2010-29897 discloses a technique of obtaining an inclination of the component by irradiating a laser beam and measuring the positions of two locations in a height direction of the component considering an inclination (deformation) of the component itself when the component is transferred to a substrate pad using an absorption nozzle, and correcting a position of the component relative to the pad.

In the first method for positioning the leading end of the component described above, there are possibilities in that it is difficult to miniaturize the component (for reducing the pitch) and there is a restriction in the assembling order of the components. In the second method for guiding the component using a mechanical guide, for example, it is difficult to form a convex-concave shape, and an applicable component is restricted. In addition, since the guide is a dedicated component, the types of applicable components are restricted. In the third method for recognizing the component using a CCD (imaging device), there are possibilities in that precision may be influenced by the number of pixels or lens focus adjustment, or takt time or equipment costs may increase.

In the component position measurement method disclosed in JP-A-2010-29897 in addition to the first to third methods, it is necessary to perform the measurement two times when the position of a single component changes. Therefore, it takes a large number of person-hours, and this makes works cumbersome.

In a case where the component is shifted using not the absorption nozzle but a chuck, the component may be gripped with a large inclination, and the position of the leading end of the component may be reversed.

SUMMARY OF THE INVENTION

It is desirable to provide a component position measurement method capable of contributing to component miniaturization, providing a concave-convex-shaped component, a wide application range of the component, wide usability, a high measurement precision, and low costs, and accurately recognizing the leading end position of the component even when the component is gripped by the chuck with an inclination.

According to a first aspect of the present invention, there is provided a component position measurement method, comprising gripping a component using a chuck; registering a gripping position of the component that is gripped by the chuck as a measurement reference position; shifting the component that is gripped by the chuck with an inclination so as to block a light beam in a direction intersecting the component at a blocking position by the component; measuring a positional deviation of the component in a direction that is inclined with respect to the measurement reference position at the blocking position by a measurement unit; obtaining a deviation amount by comparing the measurement value with the registered measurement reference position; obtaining a measurement correction value of a leading end position of the component based on a similarity relationship between a virtual triangle obtained by setting the deviation amount as one side and the measurement reference position as one point and a virtual triangle passing through the blocking position, a leading end of the component, and a position dropping from the component leading end to a horizontal line passing through the blocking position; and obtaining a component leading end position deviation amount by summing the deviation amount and the measurement correction value.

In the aforementioned configuration, vibration (inclination) is generated when the component is gripped by the chuck. The component is shifted along with the chuck in this state. The light beam irradiated from the laser sensor and the like is blocked in the middle of movement. The positional deviation amount of the blocking position of the component in an oblique direction during the blocking is measured using the measurement unit. The measurement value is compared with the measurement reference position registered in advance to compute a deviation amount. The measurement correction value of the leading end position of the component is computed by computing the ratio of the deviation amount using the fact that a similarity relationship is established between a first virtual triangle obtained by linking one side of the component passing through the measurement reference position in the event that the component has no inclination (the measurement reference position is the same even when the inclination exists), the measurement reference position, and the measurement point of the positional deviation amount, that is, the beam blocking position (the deviation amount is set to one side) and a second virtual triangle obtained by linking the same beam blocking position, a side parallel to one side of the component passing through the blocking position, and the leading end point of the component. The deviation amount of the component leading end position is computed by summing the deviation amount and the measurement correction value.

Measurement of the deviation amount may be performed by measuring the movement distance of the component until the beam is blocked by the component using the measurement unit (the laser sensor and the like are used as a switch). Alternatively, the laser sensor and the like used to irradiated the beam may be used as a measurement unit, and the position of the component may be directly measured using a laser sensor and the like. As the measurement unit, an optical fiber sensor, an optical ray sensor and the like may be used in addition to the laser beam sensor.

According to a second aspect of the present invention, in the component position measurement method according to the first aspect of the present invention, when the leading end of the component is set to a front side, and an front-back direction of the component is set to a Y direction, the light beam may be irradiated to each of X and Z directions, and the component leading end position deviation amount may be obtained for each of the X and Z directions.

In the aforementioned configuration, the positional deviation of the leading end of the component is accurately obtained in the X and Z coordinate. Since the measurement errors in the X and Z directions (widthwise and height directions) are insignificant compared to the positional deviation of the component in the Y direction (longitudinal direction), it can be negligible. The positional deviation in the Y direction is obtained using the measurement unit for measuring the movement distance of the component.

According to the present invention, even when the component is inclined in the event that the component is gripped using a chuck, it is possible to accurately recognize the positional deviation amount in the oblique direction of the component. Furthermore, it is possible to accurately recognize the leading end position of the component based on the positional deviation amount. Therefore, it is possible to easily assemble the component with a counterpart component with high precision. For example, using the extra fine laser beams, it is possible to contribute to component miniaturization, providing concave-convex-shaped components, a wide application range of the component, wide usability, high measurement precision, and low costs.

According to the present invention, since the positional deviation of the leading end of the component is accurately recognized in the X and Z directions, it is possible to assemble the component with a counterpart component with higher precision.

BRIEF DESCRIPTION OF DRAWINGS

FIG. 4 (b) is an enlarged explanatory diagram illustrating the G-portion in FIG. 4 (a).

DESCRIPTION OF THE PREFERRED EMBODIMENTS

Figure 1:
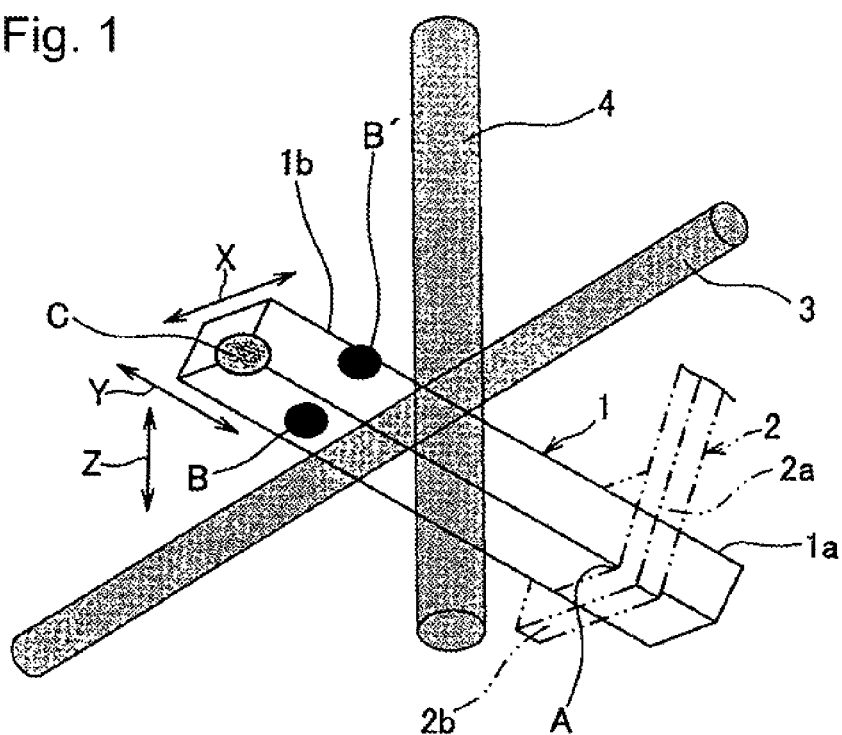
FIG. 1 is a perspective view illustrating a component position measurement method according to an embodiment of the present invention.
Figure 2:
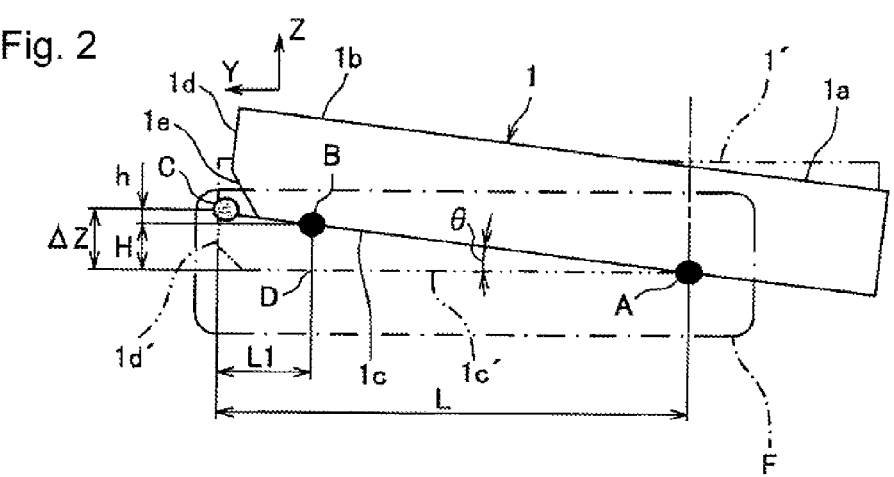
FIG. 2 is a side view illustrating an apparatus for measuring a Z directional position of the same component.
Figure 3:
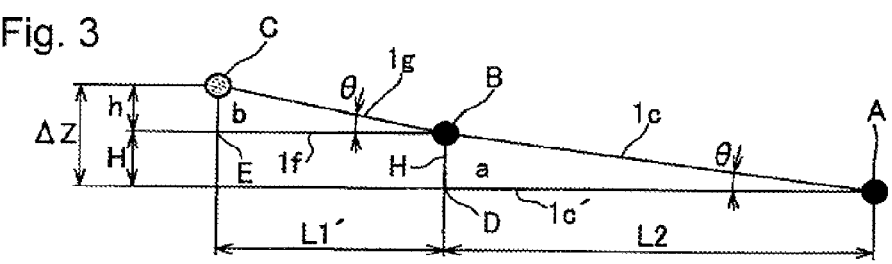
FIG. 3 is an enlarged explanatory diagram illustrating the F-portion of FIG. 2.

FIGS. 1 to 3 illustrate a component position measurement method according to an embodiment of the present invention.

According to the component position measurement method, the rear side $1a$ of the longitudinally extending component 1 is gripped using the chuck 2 as shown in FIG. 1, and the component 1 is shifted. The laser beam (beam) 3 irradiated in the X direction (the component widthwise direction or the horizontal direction) and/or the laser beam (beam) 4 irradiated in the Z direction (the component height direction or the vertical direction) are blocked on the front side $1b$ of the component 1 in the middle of the movement (B denotes the blocking position in the Z direction, and the B' denotes the blocking position in the X direction). As shown in FIG. 2 (which illustrates a case where the positional deviation in the Z direction is obtained), the position B of the component 1 when the laser beam is blocked (the laser beam blocking position) is measured with respect to the chuck position A of the component 1. Since the component 1 generates a large vibration (inclination) during the chuck is used as shown in FIG. 2, the position of the leading end (front end) C of the component 1 is computed using the inclination angle θ with respect to the measurement value of the deviation amount H of the laser beam blocking position B of the component 1 based on a similarity relationship of a triangle as shown in FIG. 3.

Referring to FIG. 1, the laser beam 3 irradiated in the X direction is to measure the Z-directional position B of the component 1, and the laser beam 4 irradiated in the Z direction is to measure the X-directional position (B') of the component 1. The X-directional laser beam 3 is blocked by or transmits through the component 1 in the Z-direction, and the Z-directional laser beam 4 is blocked by or transmits through the component 1 in the X-direction.

In FIG. 1, the reference symbol B denotes a Z-directional measurement position of the component 1 for the X-directional laser beam 3. The reference symbol B' denotes an X-directional measurement position of the component 1 for the Z-directional laser beam 4. The reference symbol C denotes a component lead edge position obtained based on a similarity relationship of a triangle, that is, the leading end corner position intersecting in the X-direction and the Z-direction. Each laser beam 3 and 4 is irradiated from each laser sensor (not shown). Using the extra fine laser beams 3 and 4, it is possible to define the measurement positions B and B' as pinpoints.

The chuck 2 includes, for example, a pair of left and right vertical gripping portions $2a$. Alternatively, the chuck 2 includes a pair of left and right vertical gripping portions $2a$ and upper and lower horizontal gripping portions $2b$. The chuck 2 is an existing one used to fix the component 1. The shape of the chuck 2 may be appropriately set depending on the type or the shape of the component 1. The chuck 2 can move in three-dimensional directions (X, Y, and Z) using shift means. The movement of the chuck 2 is performed, for example, using existing shift means, such as by threadably mounting a nut provided in the chuck nut (not shown) on a ball screw axis, and rotatably driving the ball screw axis using a servo motor. The servo motor is connected to a control unit together with each laser sensor (not shown) and is capable of measuring a movement distance of the component 1.

In FIG. 2, the reference symbol A denotes a measurement reference position which is a chuck position of the component 1. The component 1 indicated by a solid line is in the middle of movement. The component 1 in the middle of movement is inclined to ascend in an anterior direction with an inclination θ with respect to the chuck position A. The magnitude of the inclination θ is not determined. The reference numeral 1' indicated by the two-dotted chain line denotes a position of the component 1 horizontally disposed without an inclination. The reference symbol B denotes a component measurement position. The component measurement position B is a lower end (lower portion) $1c$ of the front side $1b$ of the component 1.

The reference symbol C denotes a leading end position of the component 1 obtained based on a similarity relationship of a triangle. The leading end position C of the component 1 is an intersection between extending lines of the anterior end (leading end) surface $1d$ and the inferior end surface $1c$ of the component 1. While a notch (chamfer) $1e$ is provided in the leading end bottom of the component 1, it is possible to precisely define (recognize) a virtual component leading end position C using a similarity relationship of a triangle. The reference symbol F indicated by the one-dotted chain line denotes a matching position of a similarity relationship of a triangle described in FIG. 3 described below.

The reference symbol L denotes a Y-directional horizontal distance from the chuck position A to the leading end $1d'$ of the horizontally disposed component $1'$, that is, the length of the component. The reference symbol L1 denotes a Y-directional horizontal distance from the component measurement position B of the inclined component 1 to the leading end $1d'$ of the horizontally disposed component $1'$. The reference symbol H denotes a Z-directional vertical distance from the lower end (lower side) $1c'$ of the horizontally disposed component $1'$ to the component measurement position B of the inclined component 1, that is, a Z-directional positional deviation measurement value (deviation amount). The reference symbol h denotes a Z-directional vertical distance, that is, a measurement correction value, from the component measurement position B to the leading end position C. The reference symbol $\Delta Z$ denotes a Z-directional vertical distance from the lower side $1c'$ of the horizontally disposed component $1'$ to the leading end bottom C of the inclined component 1, that is, a Z-directional component leading end position deviation amount.

Hereinafter, a Z-directional component position measurement method according to an embodiment of the present invention will be described in detail. First, the gripping position on the component 1 is determined using the chuck 2 of FIG. 1 (the component 1 is unintentionally vibrated and slightly inclined as shown in FIG. 2), and the component 1 is translated in the Z direction. In the middle of the movement, the component 1 blocks the X-directional laser beam 3 of the laser sensor. The laser sensor is arranged at the position where the laser beam 3 is blocked by the component 1. The component position B for blocking the beam is measured using measurement unit such as an NC servo or an encoder.

The laser sensor, the shift means, and the measurement unit are connected to a control unit (not shown), and the distance where the chuck 2 is jointly moved in the Z direction along with the component 1 using the shift means is measured using the measurement unit when the laser beam is blocked. However, the time that the component measurement position B blocks the laser beam 3 is delayed by as much as the upward inclination of the component 1 compared to the horizontally disposed component $1'$ (without an inclination). The measurement value during the blocking increases compared to the case of the horizontally disposed component $1'$ (if the component 1 is inclined to descend in an anterior direction, the blocking time is expedited, and the measurement value during the blocking is reduced).

The measurement result (measurement position) is compared with the measurement reference position A registered in advance to recognize the component measurement position B. That is, the measurement result is compared with the reference position A stored in advance to compute a relative deviation amount H in the Z direction with respect to the reference position A. The reference position A is measured using a reference jig and the like and registered in the control unit in advance.

Next, as shown in FIG. 3, the Z-directional distance from the measurement position B to the component leading position C, that is, the measurement correction value h is computed using the fact that the aforementioned virtual triangles a and b of different sizes have a similarity relationship based on the relative deviation amount H to the reference position A. Then, the component leading end position deviation amount $\Delta Z$ is obtained by adding the measurement correction value h to the deviation amount H of the measurement position B.

The large virtual triangle a disposed in the rear side of FIG. 3 is formed by linking the reference position A, the reference position B, and the position D dropping from the reference position B to the lower side $1c'$ of the horizontally disposed component $1'$. The small virtual triangle b disposed in the front side of FIG. 3 is formed by linking the reference position B, the component leading end position C, and the position E dropping from the component leading end position C to the horizontal line $1f$ passing through the reference position B. Both triangles a and b have a similarity relationship because the inclination angle θ between the oblique sides $1c$ and $1g$ and the lower sides $1c'$ and $1f$ is equal to the angle between lower sides $1c'$ and $1f$ and the short sides H and h perpendicular to the height direction (right angle).

In FIG. 2, the Y-directional component length L, that is, the distance from the reference position A to the leading end $1d'$ of the horizontally disposed component $1'$ is measured in advance, and the Y-directional horizontal distance L2 (FIG. 3) from the measurement position (blocking position) B to the chuck 2 (reference position A) during the beam blocking is measured using the shift means and the measurement unit. Therefore, the measurement correction value h for the measurement value H, that is, the leading end position C can be obtained as a ratio between the horizontal distances L2' and L1', for example, by computing L1' (FIG. 3) approximate to the horizontal distance L1 from the leading end $1d'$ of the horizontally disposed component $1'$ of FIG. 1 to the measurement position B by subtracting the Y-directional horizontal distance L2 from the component length L (FIG. 2).

Figure 4A:
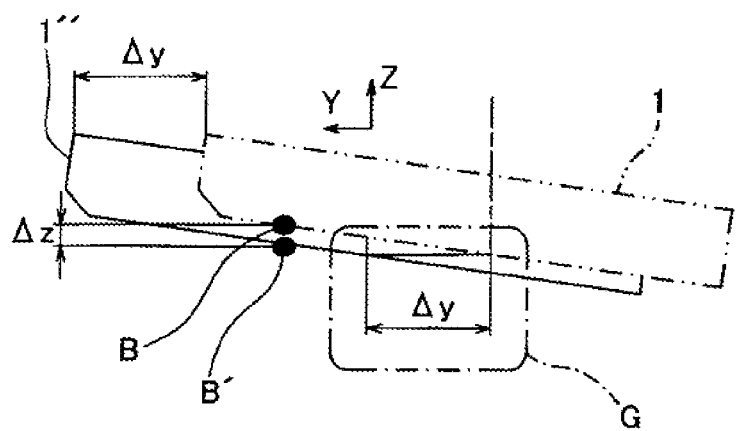
FIG. 4 (a) is a side view illustrating a relationship between a positional deviation in the Y direction of the component and the measurement error in the Z direction.
Figure 4B:
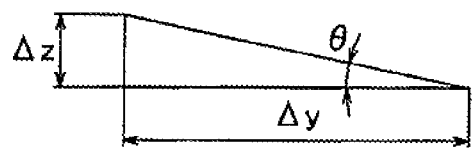

FIGS. 4(a) and 4(b) illustrate the fact that the Z-directional measurement error $\Delta z$ is insignificant even when the position of the component 1 is deviated in the Y direction (component longitudinal direction) in the event that the laser beam 3 is blocked by the component 1 (where, $\Delta y$ denotes the deviation amount).

In a case where the position of the component is deviated horizontally forward as indicated by the solid line $1''$ from the two-dotted chain line 1 (FIG. 4(a)) while the component is inclined, the position $B''$ where the laser beam 3 is irradiated to the lower portion of the component 1 is slightly lowered compared to the position B before the position is deviated. However, since the inclination θ of the component 1 is originally small, the measurement error $\Delta z$ is insignificant compared to the Y-directional component position deviation amount $\Delta y$ as shown in FIG. 4(b). That is, the measurement error $\Delta z$ is equal to the component position deviation $\Delta y \times \tan θ$.

In a case where the component 1 is not inclined even when gripped using the chuck 2 in FIG. 2 (in the case of the horizontally disposed component $1'$ as indicated by the one-dotted line), the measurement position of the component $1'$ becomes not B but D. Accordingly, the Z-directional reference position A registered in advance is identical to the Z-directional measurement result (measurement value H) of the measurement position D, and the component leading end position deviation $\Delta Z$ becomes zero, so that it is not necessary to use a similarity relationship of a triangle.

Although the Z-directional position deviation correction of the component 1 has been described in conjunction with FIGS. 2 to 4, the X-directional position deviation correction (in the widthwise direction of the component 1 of FIG. 1) of the component 1 is performed in a similar way to that of FIGS. 2 and 3 using the Z-directional laser beam 4 of FIG. 1.

Specifically, in FIG. 2, assuming that the Z-directional lower end surface $1c$ of the component 1 is a X-directional one side surface (left side), and the component 1 is inclined not in a vertical direction but in a horizontal direction, the component 1 is positioned using the chuck 2 of the rear side 1a (measurement reference position A) and shifted in the X direction, the Z-directional laser beam 4 of FIG. 1 is blocked on one side surface in the front side 1b of the component 1 to measure the position B of the one side surface (one side portion) during the blocking, the measurement result thereof is compared with the measurement reference position A stored in advance to compute the relative deviation amount H to the reference position A in the horizontal direction, the leading end position C of the component 1 is computed using the deviation amount H based on a similarity relationship of a triangle. As shown in FIGS. 4 (a) and 4 (b), although an error occurs in the X-directional measurement precision due to the Y-directional positional deviation of the component 1, it is insignificant.

It is possible to easily perform a work for assembling the (convex-shaped) component 1 with the concave portion of a counterpart component (not shown), that is, a concave-shaped component without any positional deviation by recognizing the leading end position of the component 1 in the Z and/or X directions. Accordingly, it is possible to reliably recognize the leading end position of the component 1 even when the leading end position of the component 1 is changed.

According to the aforementioned embodiment, in comparison with determination of the component leading end position or the recognition method using a mechanical guide or a CCD of the related art, the component application range is widened, and automation rate is improved. In addition, since it is not necessary to consider the deviation caused by the component precision (such as quality of the component), it is possible to stabilize quality in the process, and reduce costs for equipment or components. In addition, the component position measurement method according to an embodiment of the present invention can be widely applied to various components.

In addition, according to the embodiment described above, the laser sensor is used as an on/off switch, and the position of the component 1 when the laser beams 3 and 4 are blocked is measured using the measurement unit such as an NC servo of a servo motor for driving a ball screw axis for moving the chuck. However, in comparison, the laser sensor may be used as a measurement unit (measurement unit) to directly measure the position of the component 1 using the laser beams 3 and 4. In this case, the Z-directional position B of the component 1 in FIG. 1 can be measured using the Z-directional laser beam 4, and the X-directional position B' of the component 1 is measured using the X-directional laser beam 3. In addition, an optical fiber sensor or an optical ray sensor may be used as the measurement unit in addition to the laser sensor.

The component position measurement method according to the present invention may be applicable to any component/member (referred to as a component). For example, the present invention may be used to easily assemble such a component/member with the component/member of the counterpart with high precision.

What is claimed is:

1. A component position measurement method, comprising:
   gripping a component using a chuck;
   registering a gripping position of the component that is gripped by the chuck as a measurement reference position;
   shifting the component that is gripped by the chuck with an inclination so as to block a light beam in a direction intersecting the component at a blocking position by the component;
   measuring a positional deviation of the component in a direction that is inclined with respect to the measurement reference position at the blocking position by a measurement unit;
   obtaining a deviation amount by comparing the measurement value with the registered measurement reference position;
   obtaining a measurement correction value of a leading end position of the component based on a similarity relationship between a virtual triangle obtained by setting the deviation amount as one side and the measurement reference position as one point and a virtual triangle passing through the blocking position, a leading end of the component, and a position dropping from the component leading end to a horizontal line passing through the blocking position; and
   obtaining a component leading end position deviation amount by summing the deviation amount and the measurement correction value.

2. The component position measurement method according to claim 1, wherein, when the leading end of the component is set to a front side, and an front-back direction of the component is set to a Y direction, the light beam is irradiated to each of X and Z directions, and the component leading end position deviation amount is obtained for each of the X and Z directions.

* * * * *